United States Patent [19]
Parker et al.

[11] Patent Number: 4,867,531

[45] Date of Patent: Sep. 19, 1989

[54] PLASTIC OPTICAL FIBER FOR IN VIVO USE HAVING A BIOCOMPATIBLE POLYSILOXANE CLADDING

[75] Inventors: Theodore L. Parker, Walnut Creek; David R. Pedersen, Clayton; Peter E. Pierini, Berkeley, all of Calif.

[73] Assignee: The Dow Chemical Company, Midland, Mich.

[21] Appl. No.: 161,621

[22] Filed: Feb. 29, 1988

[51] Int. Cl.[4] ................................................ G02B 6/00
[52] U.S. Cl. .................................................. 350/96.34
[58] Field of Search ............... 350/96.29, 96.30, 96.33, 350/96.34

[56] References Cited

U.S. PATENT DOCUMENTS

| 4,317,616 | 3/1982 | Clarke ........................... 350/96.34 |
| 4,417,782 | 11/1983 | Clarke et al. .................... 350/96.29 |
| 4,431,264 | 2/1984 | Clarke ........................... 350/96.34 |
| 4,505,542 | 3/1985 | Clarke ........................... 350/96.33 |
| 4,566,755 | 1/1986 | Ohmori et al. .................. 350/96.34 |

Primary Examiner—Frank Gonzalez

[57] ABSTRACT

The present invention pertains to a flexible organic polymeric optical fiber core having an adherent flexible organic polymeric cladding on the outer surface. More particularly, the invention relates to an organic polymeric optical fiber having a polysiloxane cladding for long term in vivo use in the tissue of a living mammal, preferably a human being. In addition to compatibility in live tissue and body fluids, such a fiber must be capable of repeatedly being deformed in a small bend radius without losing the ability to transmit light. The clad optical fibers are used to measure levels of components (e.g., pH, oxygen, carbon dioxide) in living, moving tissue such as the heart or lungs.

10 Claims, 3 Drawing Sheets

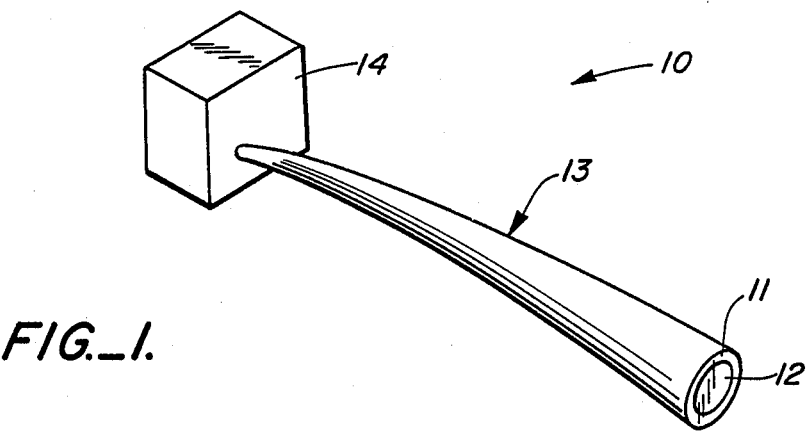
FIG._1.
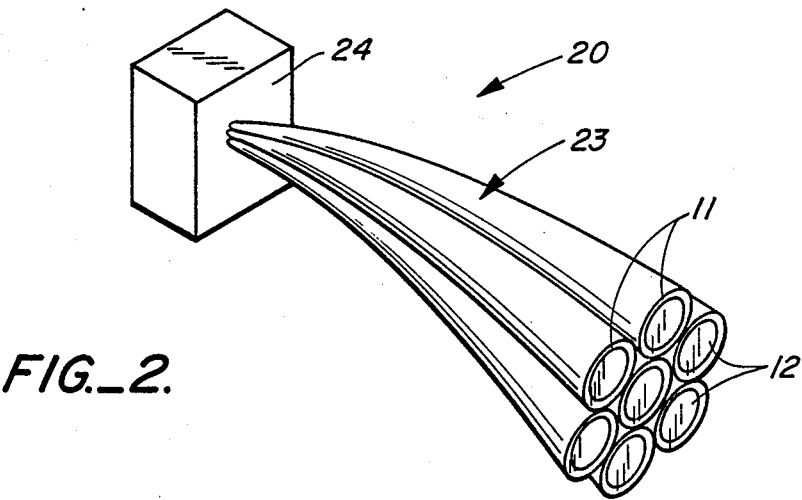
FIG._2.

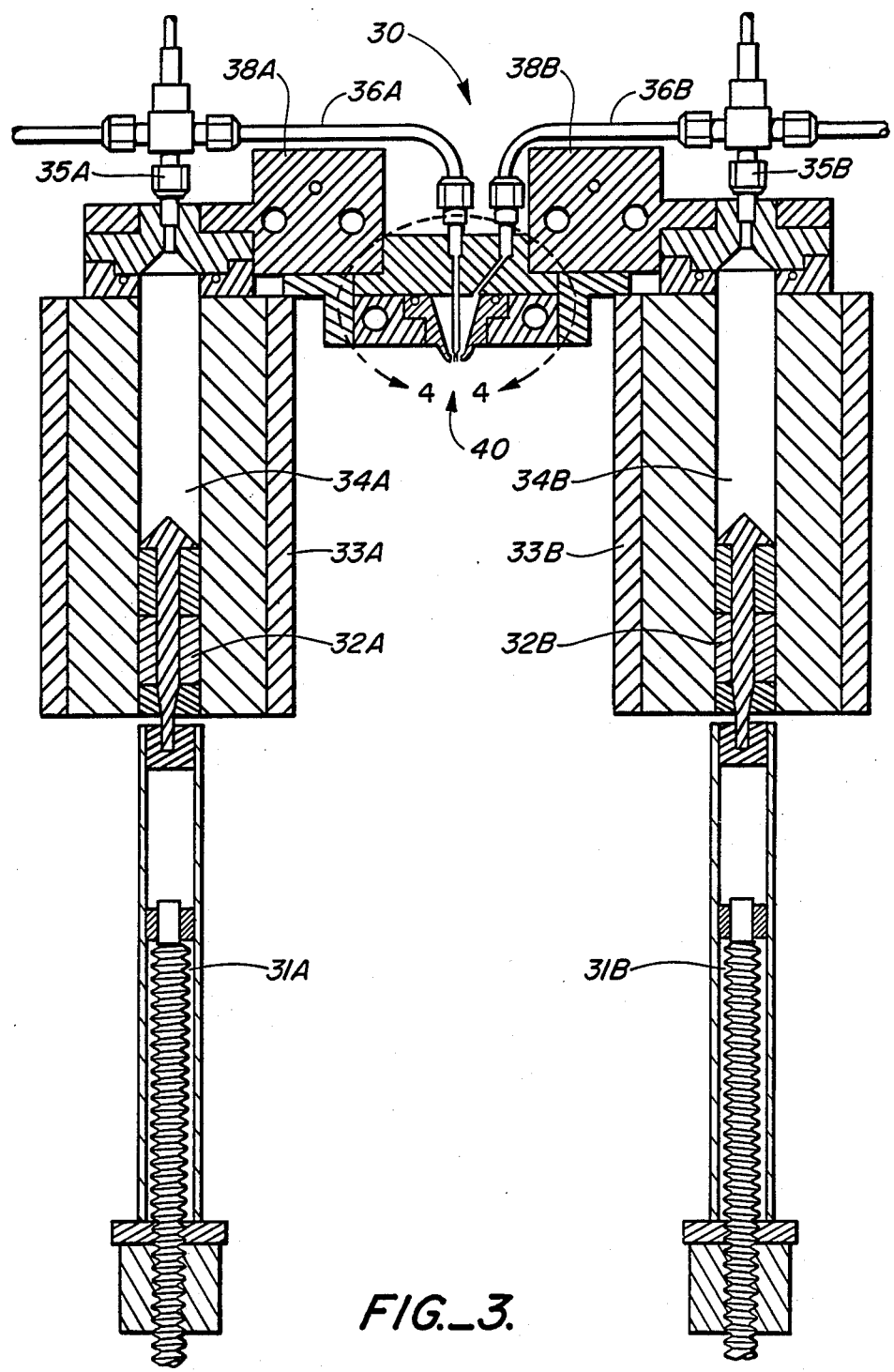
FIG._3.

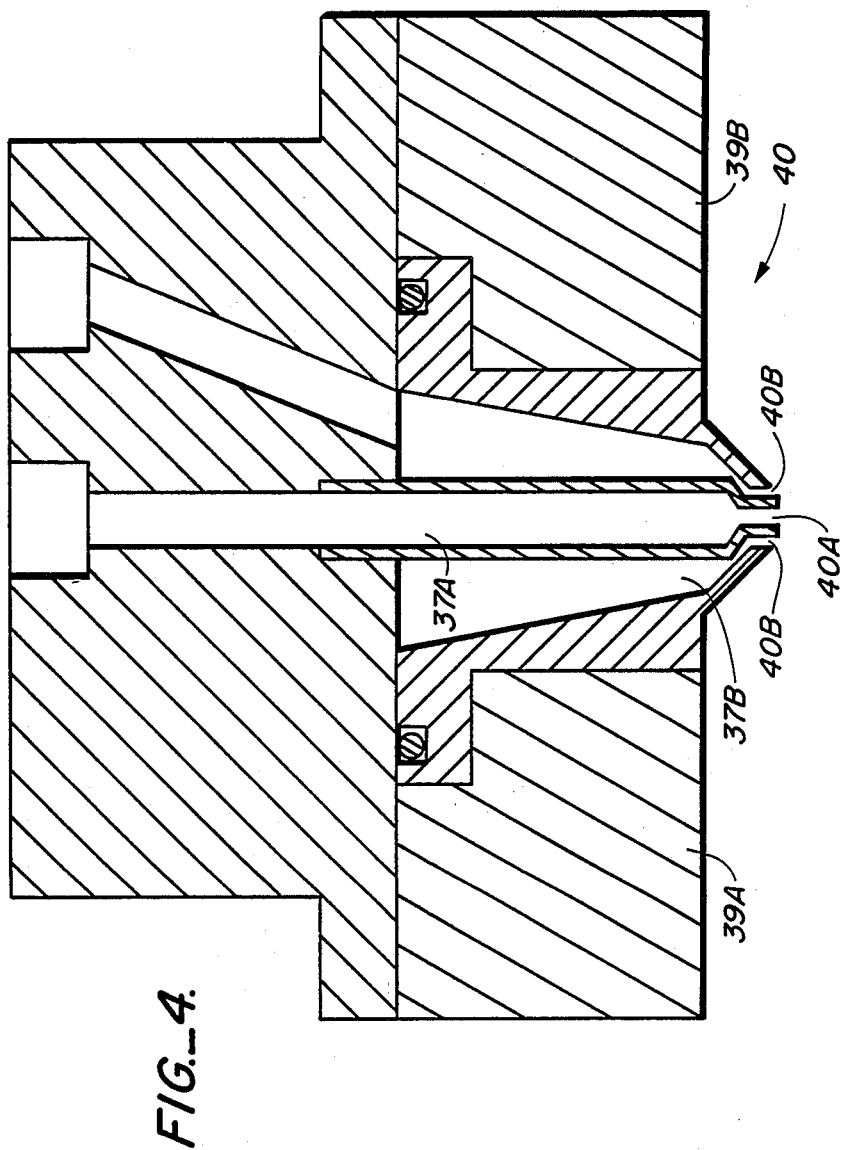
FIG._4.

PLASTIC OPTICAL FIBER FOR IN VIVO USE HAVING A BIOCOMPATIBLE POLYSILOXANE CLADDING

BACKGROUND OF THE INVENTION

1. Field of the Invention

The present invention pertains to a flexible optical fiber core having an adherent flexible organic polymeric cladding on the outer surface. Specifically, the invention relates to an optical fiber for long term in vivo use in the tissue of a living mammal, wherein the optical fiber has a flexible polysiloxane cladding on the outer surface of the optical core. The optical fiber core preferably has a refractive index of at least 0.01 greater than the refractive index of the polymeric cladding.

2. Description of the Related Art

Fiber optics have been known for a number of years as described by A. D. Pearson et al. in "Fiber Optics" in the *Kirk-Othmer:Encyclopedia of Chemical Technology*, 3rd Ed., Vol. 10, John Wiley & Sons, New York, N.Y., pp. 125–147, published in 1980. Also see A. C. Levy, "Optical Fibers," in the *Encyclopedia of Polymer Science and Engineering*, H. F. Mark et al (ed.) Vol. 7, pp. 1 to 15, John Wiley and Sons, New York, N.Y., published in 1986.

S. Kingsley, et al., in *FC-7*; Fiber Optics Sensors, Chapter 10 "Chemical Sensors", published in 1984 by Information Gate Keepers, 214 Harvard Avenue, Boston, Mass. 02134, discusses the use of a number of sensors for in vitro use.

S. R. Goldstein, European Pat. No. 073-558-A2 (March 1983) discloses the use of a chemical sensor for pH using a pH sensitive dye with an optical fiber.

B. Noethe et al. in U.S. Pat. No. 4,133,915 discloses an optical glass fiber which is first coated with a high boiling optically clear liquid, then coated with a curable resin, such as a urethane.

T. E. Bishop et al. in U.S. Pat. No. 4,472,019 disclose radiation curable coating compositions adapted for application to buffer-coated optical fibers. The new composition comprises (1) from 25 to 70% of a diethylenic-terminated polyurethane (which may include urea linkages), where the polyurethane is based on a diisocyanate having an average molecular weight of from 400 to 5000 daltons, (2) from 5% to 40% of a diethylenically unsaturated ester of a diglycidyl ether of a bisphenol having a molecular weight up to about 1000, and (3) from 5 to 30% of a liquid radiation-curable monoethylenically unsaturated monomer having a Tg above about 55° C., especially N-vinyl pyrrolidone.

Poly(siloxanes) and silicones are known as described by B. B. Hardman "Silicones" in the *Kirk-Othmer: Encyclopedia of Chemical Technology*, Vol. 20, pp. 922–962, published in 1982 by John Wiley & Sons of New York, N.Y.

"Urethane Polymers" are described by H. Ulrich in the *Kirk-Othmer: Encyclopedia of Chemical Technology*, Vol. 23, 576–608, published by John Wiley & Sons of New York, N.Y. in 1983.

J. H. W. Cramp et al in U.K. Patent No. 2,103,786A discloses the use of a chromophoric layer which is sensitive to pH changes at the analytical probe end of the optical fiber.

The above references are incorporated herein by reference.

None of these references teach or suggest a current plastic for use as an organic polymeric optical fiber or a polymeric clad for long-term use in the tissue of a living mammal. An optical fiber for in vivo use in the body area of the moving, beating heart, such as would be required in a heart pacemaker or a defibrillator, needs specific mechanical properties in addition to live tissue/body fluid compatibility. Such a fiber must be capable of being repeatedly deformed in a small bend radius without losing the ability to transmit light. That is, such an optical fiber for use in a moving, beating heart must have tremendous resistance to the development of microbending optical loss. The optical fibers of the present invention are useful in any body area for the measurement of various levels of substances or materials in a human body.

SUMMARY OF THE INVENTION

The present invention relates to an organic resin coated flexible optical fiber, wherein the organic polymeric resin cladding is a curable polysiloxane and the optical fiber core is an aliphatic linear segmented polyurethane, poly(methyl methacrylate), poly(carbonate), poly(urethane), or copolymers of styrene and methyl methacrylate, styrene and methyl acrylate, methyl methacrylate and ethyl acrylate, styrene and α-methyl styrene or styrene and vinyl toluene.

In a related aspect the optical fiber has an organic polymeric cladding which is biologically compatible with the tissue of a living mammal.

In another aspect, the clad optical fiber has a refractive index for the optical fiber core which is at least 0.01 units greater than the refractive index of the polysiloxane clad.

In another aspect, the present invention relates to a method of producing a biocompatible organic resin coated flexible organic polymer optical fiber having a light attentuation loss of 20 decibels/meter or less, which method comprises:

(a) obtaining a dry organic polymer;

(b) heating the organic polymer in an inert atmosphere to melt the polymer;

(c) filtering the melted polymer at elevated temperature in inert atmosphere using a 20 micron or smaller filter;

(d) extruding at elevated temperature a monofilament of molten polymer through a 0.25 inch or smaller diameter spinnerette;

(e) cooling the produced monofilament to produce an optical fiber core;

(f) applying to the surface of the monofilament of step (e) a coating of a polysiloxane to produce a coating of between about 0.0001 and 0.01 inch in thickness; and (g) curing the organic polymer coating in place to produce a solid organic polymeric cladding wherein the curing occurs under conditions which require no heating.

BRIEF DESCRIPTION OF THE DRAWINGS

FIG. 1 shows an enlarged schematic view of a single clad plastic optical fiber.

FIG. 2 shows a schematic view of an array of clad plastic optical fibers to act as a probe transmitting and increasing a signal or to detect different signals.

FIG. 3 shows a cross-sectional representation of a polymeric co-extrusion apparatus.

FIG. 4 shows a cross-sectional representation of the spinnerette region of the co-extension apparatus along line 4—4 of FIG. 3.

DETAILED DESCRIPTION OF THE INVENTION AND PREFERRED EMBODIMENTS

Definitions

As used herein:

"Diisocyanate" refers to the aliphatic diisocyanates described by G. R. Collins, U.S. Pat. No. 4,621,113, which is incorporated herein by reference.

"Glycol" refers to glycols as described by G. R. Collins (above), and also includes short segments of diols having 2-6 carbon atoms.

"Chain Extender" refers to short chain non flexibilizing compounds as described by Collins above.

"Macroglycol" refers to a polyglycol having a molecular weight of between about 1000 to about 6000 daltons as described by Collins above.

Referring now to FIG. 1, the optical fiber core 12 and clad 11 are connected via line 13 to a recorder or analyzer 14 in an analytical system 10. Recorder or analyzer 14 can be any one of a group of analytical/recording/or storage devices known in the art. FIG. 2 shows a tightly packed array 20 of the optical fiber core 12 and cladding 11, which is connected to analyzer/detector 24 via multifilament 23. An array is used to provide an additive signal for measurement or can be used to measure different aspects of the fluid or tissue within the body, e.g., pH, oxygen, carbon dioxide, etc. The optical fiber of the present invention for use, such as in a beating heart, must have tremendous resistance to the development of microbending optical loss. A preferred fiber is one where the optical core has a refractive index of at least 0.01 greater than the refractive index of the polymeric cladding.

Currently available plastic optical fibers are usually clad with poly(methyl methylacrylate) (PMMA), or poly(vinylidene fluoride) (PVDF). However, currently available polymer is not suitable for contact with living tissue and body fluids. New sensing devices have been developed and are available for sensing biologically important chemical species (such as pH, $pO_2$, $pCO_2$), using optrodes (optical sensing devices). By proper selection of the optical properties in a core plastic, and a biologically compatible polymeric optical clad, a polymer optical fiber (POF) capable for use in real time in vivo medical diagnostics is produced. Typically, the use of a poly(urethane) for use in an optical fiber is restricted to buffer coats over the optical glass core, and under the over-wrap in an optical cable.

In the present invention, the poly(siloxane) layer is both the optical clad and the exterior layer to be in contact with the body tissue and body fluids. In this way, a smaller, thinner, more supple optical fiber (filament) is prepared for insertion directly into the body and through confined orifices, such as blood vessels. A preferred clad is a UV curable siloxane from Dow Corning, Midland, Mich. 46840, Grade DC-6256-100.

A preferred optical core for the fiber is independently selected from any of the following, poly(styrene), PMMA, poly(carbonate), poly(urethane) or the like.

The poly(siloxanes) as the cured cladding of the present invention are normally those monomers found in the chemical art.

Various compositional, structural and processing factors which affect the biological and physical properties of segmented poly(urethanes) are well known and described by Collins in U.S. Pat. No. 4,621,113 and also by C. G. Gebelein in "Prosthetic and Medical Devices" In *Kirk-Othmer: Encyclopedia of Chemical Technology*, 3rd ed., Vol. 19, pp 275–313, published in 1982; and also see Wong et al, "Structure-Property Relationships of Transparent Cycloaliphatic Polyurethane Elastomers," 186th Annual National Meeting of the American Chemical Society (Proceedings), Washington, D.C., published in 1983, all of which are incorporated herein by reference.

There are a number of methods to produce the plastic optical fibers of the present invention.

Extrusion—The plastic optical core and the polymeric cladding are simultaneously co-extruded from an apparatus as shown in FIGS. 3 and 4. FIG. 3 is a coextrusion apparatus 30.

Drive screw 31A for the molten filtered polymer of the core is used to mechanically push seal piston 32A up through heated block 33A. The molten or softened polymer 34A is forced through lines 35A and 36A into chamber 37A to the middle opening 40A of the spinnerette shown in FIGS. 3 and 4. The core polymer is kept molten at the appropriate temperature using heat blocks 38A and 39A and 39B.

In a similar manner, drive screw 31B for the molten polymer of the cladding is used to mechanically push seal piston 32B up through heated block 33B. The molten or softened polymer 34B is forced through heated lines 35B and 36B into chamber 37B to the concentric outer opening 40B of the spinnerette shown in FIGS. 3 and 4. The polymer is kept molten at the appropriate temperature using heat blocks 38B and 39A and 39B.

As is shown in cross-section in FIG. 4, at the top of the openings of the spinnerette, core polymer 34A enters at 37A and clad polymer 34B enters at 37B. The core polymer moves down through channel 37A and extrudes as a continuous small diameter solid cylinder at 40A. The clad polymer 34B moves down through channel 37B and extrudes as a continuous small diameter hollow cylinder at 40B. The cylinders combine and the clad/core light fiber is thus formed upon cooling.

Cup Coating—In cup coating the polymer core fiber is prepared using the apparatus of FIGS. 3 and 4, with the exception that only the core side (A) has polymer. The clad portion is empty. After extrusion the filament is then pulled through a hole in a cup containing a polymer solution or the monomers to form the clad polymer. A thin film is deposited on the core surface which is immediately either cured using mild heat or preferably using UV-radiation. Unsaturated (acrylate or vinyl) terminated poly(urethanes) or poly(siloxanes) are usually used for UV curing. Cup coating of polymers is known in the art as described by Heathway, Inc. Horsham, Pa.

In one preferred embodiment the flexible clad optical fiber is one where the flexible optical fiber core is independently selected from poly(styrene), poly(methylmethacrylate), poly(carbonate), poly(urethane) or copolymers of styrene and methyl methacrylate, styrene and methyl acrylate, methyl methacrylate and ethyl acrylate, styrene and α-methyl styrene or styrene and vinyl toluene, or the like.

In another preferred embodiment the flexible optical fiber is one where the organic polymeric cladding is a poly(siloxane).

In still another preferred embodiment the flexible optical fiber is one where the flexible optical fiber core is selected from poly(styrene) or from a poly(urethane).

A preferred embodiment of the process is one where the temperatures of steps (b), (c) and (d) are each between about 200° and 450° F., especially about 300° to 350°F.

In another preferred embodiment, the process is one where the optical fiber organic polymer core is selected from poly(styrene), poly(methyl methacrylate), poly(carbonate) or poly(urethane), especially the process and fiber where the organic polymeric cladding is a poly(siloxane).

Usually, the organic polymeric core has a refractive index which is between about 0.01 and 0.13 units greater than the refractive index of the polymeric cladding.

Existing analytical devices such as a Hewlett Packard Model 47102A Ear Oximeter (Hewlett Packard Corporation, Page Mill Road, Palo Alto, Calif. 94304), are adapted to interface with the biocompatible clad optical fibers of the present invention.

The following examples are to be interpreted as being descriptive and illustrative only. They are not to be construed as being limiting in any way.

EXAMPLE 1

Poly(styrene) Core Having a Poly(siloxane) Cladding (a) A dual ram coextrusion apparatus as is available in the art or as shown in FIGS. 3 and 4 is charged for the core with poly(styrene) pellets, (polymer optical fiber (POF) grade, MW 200,000, Dow Chemical Co., Midland, Mich., 48640) and is heated to 340° F. The cladding chamber is empty. The transfers are held at 360° F. for poly(styrene). The spinnerette tip is held at 340° F. A core polymeric optical fiber is melt extruded to give a 750 micron diameter optical fiber. Refractive Index (RI)=1.59.

Poly(siloxane) Cup Coating of Poly(styrene) Optical Fiber (b) The optical fiber of Example 1 is then cup coated by moving the poly(styrene) fiber through a cup coating apparatus available from Heathway, Inc., of Horsham, Pa. The cup coater is filled with a solution of uncured poly(siloxane), (UV cured siloxane Dow Corning Corporation, Midland, Mich. 48640, Grade DC 6256-100). The coated core is immediately treated with UV light for about 1 sec. to cure the cladding. The Fusion UV curing apparatus is from Lesco, Inc., Redondo Beach, Calif. The light attenuation value for the fiber is found to be 1.15 decibels/meter. RI of clad is 1.42–1.46.

EXAMPLE 2

Use of the Clad Optical Fiber in Detecting the pH Level in the Blood

The clad fiber of Example 1 has a chromophore which is sensitive to pH attached at its analytical probe tip, see Cramp et al. above. This probe is implanted in the left ventricle of the heart of a living dog and in this constantly moving environment allows measurement for pH for 90 days.

EXAMPLE 3

Polyurethane Core/Poly(siloxane) Clad (a) The procedure described in Example 1 is repeated except that the poly(styrene) core is replaced by a poly(urethane) core as described by Collins above. A poly(urethane) core/poly(siloxane) clad optical fiber is obtained which is biocompatible.

While only a few embodiments of the invention have been shown and described herein, it will become apparent to those skilled in the art that various modifications and changes can be made in a polymer clad optical fiber, its fabrication, or its use as an optical probe in a living mammal, preferably a human being, without departing from the spirit and scope of the present invention. All such modifications and changes coming within the scope of the appended claims ar intended to be carried out thereby.

We claim:

1. An organic resin coated flexible optical fiber, wherein the organic polymeric resin cladding is a cured polysiloxane which is curable in the absence of heat and is biologically compatible with the tissue of a living mammal, and the optical fiber core material is an organic polymer selected from poly(styrene), poly(carbonate), poly(urethane), or copolymers of styrene and methyl methacrylate, styrene and methyl acrylate, methylmethacrylate and ethyl acrylate, styrene and α-methyl styrene or styrene and vinyl toluene.

2. The organic resin coated flexible optical fiber of claim 1 wherein the optical fiber core material has a refractive index which is at least 0.01 units greater than the refractive index of the polysiloxane cladding.

3. The organic resin coated flexible optical fiber of claim 2 where the light attenuation loss in the clad/core optical fiber combination is about 20 decibels/meter or less.

4. The organic resin coated flexible optical fiber of claim 2 wherein the refractive index of the core material is between about 0.01 and 0.17 units greater than the refractive index of the polysiloxane clad.

5. An organic resin coated flexible optical fiber consisting essentially of a optical core and a polysiloxane cladding wherein:

the optical core material is an organic polymer selected from poly(styrene), poly(urethane) or a linear segmented polyurethane each having a refractive index which is at least 0.01 units greater than the refractive index of the polysiloxane cladding, and a cured polysiloxane cladding, wherein the light attenuation loss in the core/cladding combination is about 20 decibels/meter or less.

6. The organic resin coated flexible optical fiber of claim 5 wherein the core material is poly(styrene).

7. The organic resin coated flexible optical fiber of claim 5 wherein the core material is poly(urethane).

8. The organic resin coated flexible optical fiber of claim 5 wherein the core material is a linear segmented polyurethane.

9. An optical fiber having a biocompatible organic cladding about a flexible organic polymer optical fiber core, the combination having a light attenuation loss of 20 decibels/meter or less, which optical fiber is produced by a method which comprises:

(a) obtaining a dry organic polymer selected from poly(styrene), poly(carbonate), poly(urethane), or copolymers of styrene and methyl methacrylate, styrene and methyl acrylate, methyl methacrylate and ethyl acrylate, styrene and α-methyl styrene or styrene and vinyl toluene;

(b) heating the organic polymer in an inert atmosphere to melt the polymer;

(c) filtering the melted polymer at elevated temperature in inert atmosphere using a 20 micron or smaller filter;
(d) extruding at elevated temperature a monofilament of molten polymer through a 0.25 inch or small diameter spinnerette;
(e) cooling the produced monofilament to produce an optical fiber core;
(f) applying to the surface of the monofilament of step (e) a coating of a polysiloxane to produce a coating of between about 0.0001 and 0.01 inch in thickness; and (g) curing the organic polymer coating in place to produce a solid organic polymeric cladding wherein the curing occurs under conditions which do not require heat.

10. The optical fiber of claim 9 wherein:
in the obtaining step the organic polymer consists essentially of a poly(urethane) polymer;
in the heating and filtering steps the organic polymer is heated and filtered through a filter of about 5 microns at between about 290° and 400° F., and
in the extruding step the extrusion is performed at between about 290° and 400° F.

* * * * *